United States Patent
Ahlström et al.

(10) Patent No.: US 6,405,051 B1
(45) Date of Patent: Jun. 11, 2002

(54) METHOD AND APPARATUS FOR USING A B-ANSWER SIGNAL TO PREVENT A VOICE ANNOUNCEMENT IN A GROUP CALL

(75) Inventors: Lars Gunnar Folke Ahlström, Västra Frölunda; Jan Peter Ramle, Mölnlycke, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/329,897

(22) Filed: Jun. 10, 1999

(51) Int. Cl.[7] .............................. H04Q 7/20; H04B 7/00
(52) U.S. Cl. .................... 455/518; 455/413; 455/416
(58) Field of Search ............................... 455/416, 445, 455/433, 413, 414, 518, 519

(56) References Cited

U.S. PATENT DOCUMENTS

| | | | |
|---|---|---|---|
| 4,682,367 A | 7/1987 | Childress et al. | 455/17 |
| 5,465,391 A | 11/1995 | Töyrylä | 455/33.4 |
| 5,491,835 A | 2/1996 | Sasuta et al. | 455/34.1 |
| 5,502,762 A | 3/1996 | Andrew et al. | 379/202 |
| 5,752,191 A | 5/1998 | Fuller et al. | 455/445 |
| 5,884,180 A | * 3/1999 | Bertacchi | 455/445 |
| 5,953,400 A | * 9/1999 | Rosenthal et al. | 379/202 |
| 5,963,894 A | * 10/1999 | O'Neil et al. | 455/445 |

FOREIGN PATENT DOCUMENTS

| | | |
|---|---|---|
| CA | 2045959 | 1/1992 |
| EP | RS 103324 US | 2/2000 |
| JP | 0175438 | 6/1996 |
| WO | WO 97/01252 | 1/1997 |
| WO | WO 98/09423 | 3/1998 |

* cited by examiner

Primary Examiner—Edward F. Urban
Assistant Examiner—Marceau Milord
(74) Attorney, Agent, or Firm—Jenkens & Gilchrist A Professional Corporation

(57) ABSTRACT

A technique for preventing voice announcements in a group call is provided. If any voice activity precedes a B-answer signal on a call to a party, that party is not added to the group call. This approach guarantees that no voice announcements will be added to the group call. With this approach, all subscribers are allowed to use voice mail systems, but subscribers currently forwarding messages to a voice mail system will not be connected to group calls.

21 Claims, 3 Drawing Sheets

METHOD AND APPARATUS FOR USING A B-ANSWER SIGNAL TO PREVENT A VOICE ANNOUNCEMENT IN A GROUP CALL

CROSS-REFERENCE TO RELATED APPLICATIONS

This Application relates to the applications entitled: METHOD AND APPARATUS FOR USING A MS TONE TO PREVENT A VOICE ANNOUNCEMENT IN A GROUP CALL, U.S. application Ser. No. 09/330,468, and METHOD AND APPARATUS FOR USING A VM TONE TO PREVENT A VOICE ANNOUNCEMENT IN A GROUP CALL, U.S. application Ser. No. 09,330,232.

These applications are being filed simultaneously herewith in the U.S. Patent & Trademark Office.

FIELD OF THE INVENTION

The present invention relates generally to mobile networks and, more particularly, to a technique which supports group calls in mobile networks.

BACKGROUND OF THE INVENTION

One important service provided by a group server connected to a Public Land Mobile Network (PLMN) is that of automatically establishing group calls. A group call is a conference call in which all participants can in turn talk and listen to each other, or, alternately, a broadcast call in which all the participants simultaneously receive a transmitted message. Another important service which is starting to be provided in PLMNs is that of voice mail. This service allows a mobile subscriber to, instead of immediately receiving a telephone call from a calling party, forward the call to a voice mail system which will then offer the calling party an opportunity to leave a voice mail message, which is then stored and later retrieved by the mobile subscriber. A problem may develop in the interaction of these two services, in that, during the process of setting up a group call, one of the mobile stations may have the call forward feature set so that all of its calls are forwarded to a voice mail system. In this case, a connection for the call will be made to the voice mail system which will then produce a voice mail announcement. Thus, a connection will not be established to the intended mobile station, and if nothing is done further to correct this unintended action, the automated group controller will connect the voice mail system to the group call.

In the related art, there are several solutions which have been proposed to solve this problem. Each of the solutions has corresponding disadvantages. One proposed solution is to permanently switch off the call forward service for all subscribers that may be part of a group call. However, this would preclude these subscribers from using the call forward feature. Since the call forward feature is a standard feature in PLMNs, this is not a desirable solution.

Another proposed solution is to provide a mobile subscriber with dual subscriptions, i.e. a subscription exclusively dedicated to group calls and a regular subscription for all other calls. The group call subscription would have call forward service permanently disabled. The regular subscription would allow the call forward service. Although dual subscriptions appears to be a good solution, this solution may cause conflict with fraud detection systems in the network since the mobile equipment can change subscriptions very quickly.

In yet another proposed solution, it is possible for the automated group controller to switch off the call forward service for the terminating parties, i.e. the parties to be added to the group call. In this approach, the automated group controller accesses the home location register (HLR) to determine if the called party is detached or otherwise unreachable. The automated group controller may then switch off the call forward service of the called party. However, there are problems with this approach. First, an interface will have to be developed exclusively to enable this interaction between the automated group controller and the HLR. Then there is the security problem of providing HLR information to the automated group controller. There is also a problem if someone else calls the terminating party after the call forward service has been switched off. There is also a problem if the automated group controller fails to reset the changes in the HLR. Additional problems result in handling additional call forward services, such as call forward on no reply and call forward on busy.

In yet another proposed solution, the automated group controller detects a backward notification of the call forward service and only adds those parties that have not enabled the call forward feature. Backward notification only works for an automated group controller using the Integrated Services Digital Network User Part (ISUP) of some versions of the Global Systems For Mobile Communications (GSM). In these versions of GSM, a backward notification signal is sent to the automated group controller indicating that a call forward service is in progress, e.g., Advance Mobile Phone Service (AMPS) networks do not support backward notification of a call forward service.

In view of the foregoing, it would be desirable to provide one or more techniques which overcomes the above-described inadequacies and shortcomings of the above-described proposed solutions.

SUMMARY OF THE INVENTION

According to the present invention, a technique for using a B-answer signal to prevent a voice mail announcement in a group call is provided. The group call may be initiated by an originator sending a group call number over a telecommunications network to a group controller. Preferably, the telecommunication network includes one or more Public Land Mobile Networks and may include a Public Switched Telephone Network.

In one aspect of the present invention, the group call involves a plurality of potential participants of the group call. Each of the plurality of potential participants of the group call receives an individual call from the group controller. A first potential participant of the plurality of potential participants of the group call forwards its received individual call to a response system. The response system is a network response system or a voice mail system. An announcement signal containing voice activity is generated, preferably by the response system, in response to the forwarded individual call. The response system is configured to generate the announcement signal before generating a B-answer answer signal, thus enabling the caller to record a voice message. The voice activity of the announcement signal is detected, preferably, by a voice detector associated with the group controller. Upon detection of the voice activity, the first potential participant is excluded from the group call, preferably when voice activity is detected before the B-answer signal is received.

In another aspect of the present invention, a second potential participant of the potential participants is connected to the group call. The second potential participant is connected to the group controller so that the group controller receives a B-answer signal before the voice activity. The second potential participant does not forward its received individual call to the response system.

In still another aspect of the present invention, the present invention comprises a voice detector, preferably, associated with the group controller, configured to detect voice activity on any one of the individual call connections of the group call. Any one of the call connections is disconnected, preferably by the group controller, if the voice activity associated with that call connection is detected before a B-answer signal is received. The call connection may be associated with the response system generating the voice activity or a mobile station generating the B-answer in response to one of the call connections.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
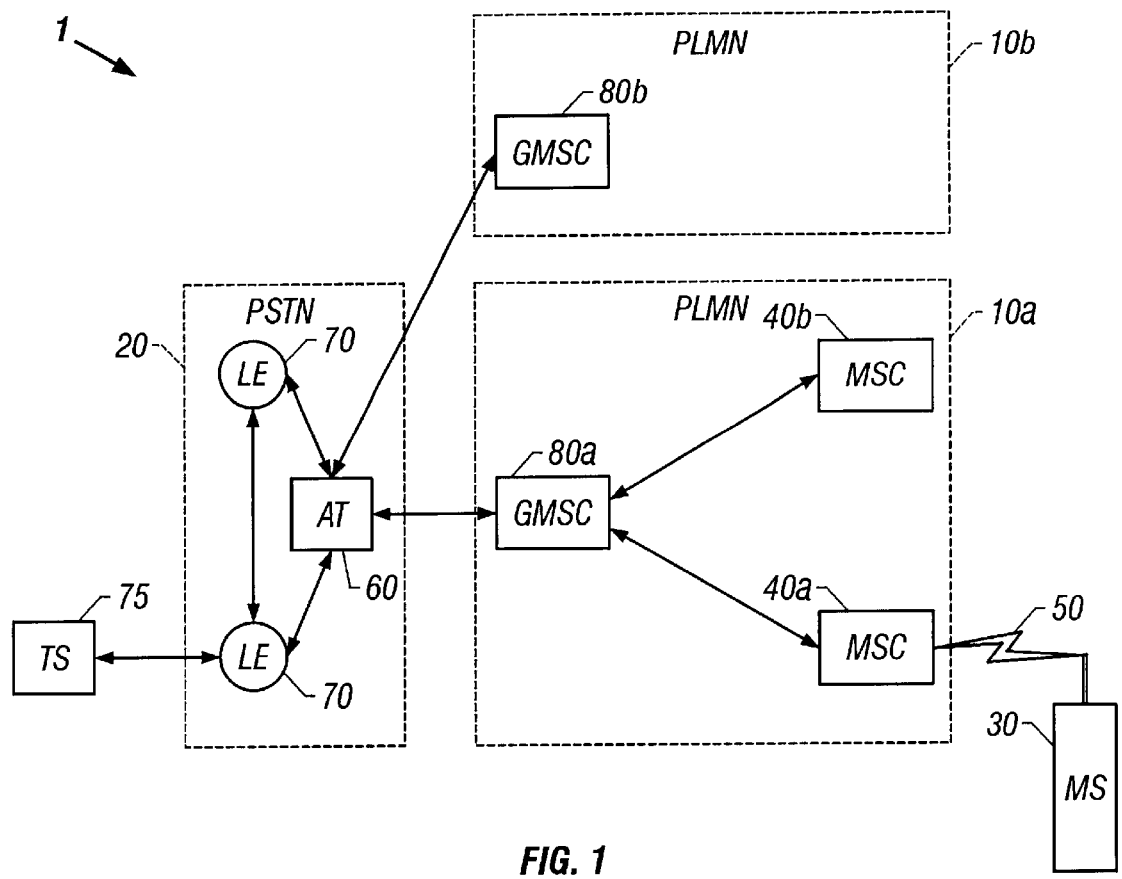
FIG. 1 is a block diagram illustrating the network connection of multiple Public Land Mobile Networks (PLMNs) to a Public Switched Telephone Network (PSTN) in accordance with the present invention.

Referring to FIG. 1, there is shown a block diagram illustrating a telecommunications network 1 having multiple Public Land Mobile Networks (PLMNs) 10 interconnected to a Public Switched Telephone Network (PSTN) 20. A mobile station (MS) 30 is associated with one of the PLMNs 10 (i.e., the home PLMN 10a). Within each PLMN 10, there are a number of different mobile switching centers (MSC) 40 servicing the geographical area covered by that PLMN 10. A home location register (HLR, not shown) and a visitor's location register (VLR, not shown) are associated with each MSC 40. The mobile station (MS) 30 is serviced by one of the MSCs 40 (i.e., the servicing MSC 40a). The servicing MSC 40a establishes call connections over a radio link 50 with the mobile station (MS) 30. Within each PLMN 10, there exists a Gateway Mobile Switching Center (GMSC) 80 for routing incoming calls intended for a mobile station to the appropriate MSC 40. The PLMNs 10 establish call connections with telephone subscribers of the PSTN 20 via the GMSCs 80. Thus, a mobile phone subscriber at mobile station (MS) 30 is capable of communicating through the network 1 with a telephone subscriber of the PSTN 20 at a telephone station (TS) 75 associated with the PSTN 20. As an illustration, a call to the MS 30 initiated at the TS 75 is routed to one of the local exchanges (LE) 70 of the PSTN 20, which then routes the call to an access tandem (AT) 60. The access tandem (AT) 60 then routes the call to the GMSC 80a, which then routes the call to the MSC 40a, i.e the mobile switching center servicing the mobile station 30. The MSC 40a then finds the location of the mobile station 30 in its HLR and routes the call to the mobile station 30 over the radio link 50.

Figure 2:
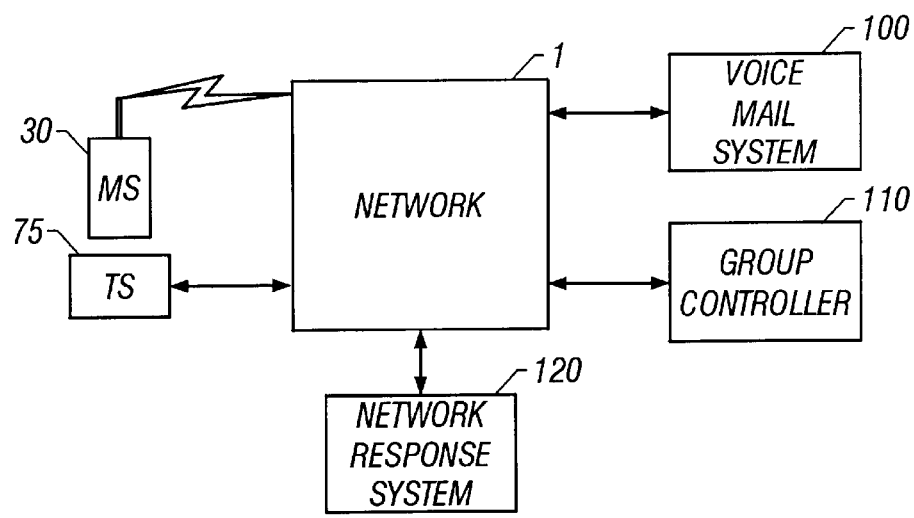
FIG. 2 is a block diagram illustrating the telecommunication network of FIG. 1 being coupled to systems providing services to that network.

FIG. 2 illustrates the telecommunications network 1 coupled to a voice mail system 100, a group controller 110, and a network response system 120. These systems may communicate with each other and network subscribers (e.g., MS 30 and TS 75) over the communication paths of the network 1.

The group controller 110 is responsible for setting up and then monitoring ongoing group calls for the network 1. The group controller 110 is preferably associated with an MSC 40. However, the group controller 110 generally may be connected to any location of network 1 using the available communication paths of network 1. The group controller 110 may be an independent server, or alternately, a group of distributed servers, or a computer system.

The voice mail system 100 is configured to record, store, and retrieve messages forwarded from the mobile stations, e.g., mobile station 30, of one or more Public Land Mobile Networks 10 of network 1. Typically, the voice mail system 100 is shared by several MSCs in a PLMN.

The network response system 120 is configured to respond to a failed call setup, e.g., a called party is unreachable, placed to mobile stations associated with a PLMN 10. For example, a call placed through the network 1 may not be able to reach a mobile station that has suddenly dropped out due to lack of radio coverage. In this situation, the network response system 120 transmits a message to the calling party explaining that a call connection cannot be made.

Figure 3:
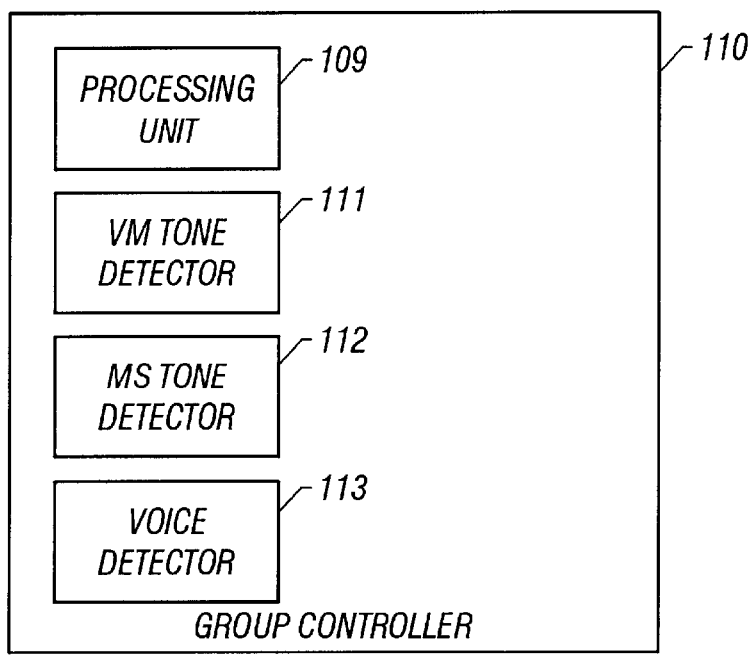
FIG. 3 is a block diagram illustrating a group controller of group calls according to the present invention.

FIG. 3 illustrates an embodiment of the group controller 110 according to the present invention. The group controller 110 includes a processing unit 109 configured to perform the tasks of setting up and managing one or more group calls. The group controller 110 also includes a voice mail (VM) tone detector 111, a mobile station (MS) tone detector 112, and a voice detector 113, each for detecting signals of incoming calls. The method and apparatus of the present invention specifically employs the voice detector 113. The MS tone detector 112 is employed in the previously referenced related application entitled "Method and Apparatus For Using A MS Tone To Prevent A Voice Announcement In A Group Call" and the VM tone detector 111 is employed in the previously referenced related application entitled "Method and Apparatus For Using A VM Tone To Prevent A Voice Announcement In A Group Call".

Figure 4:
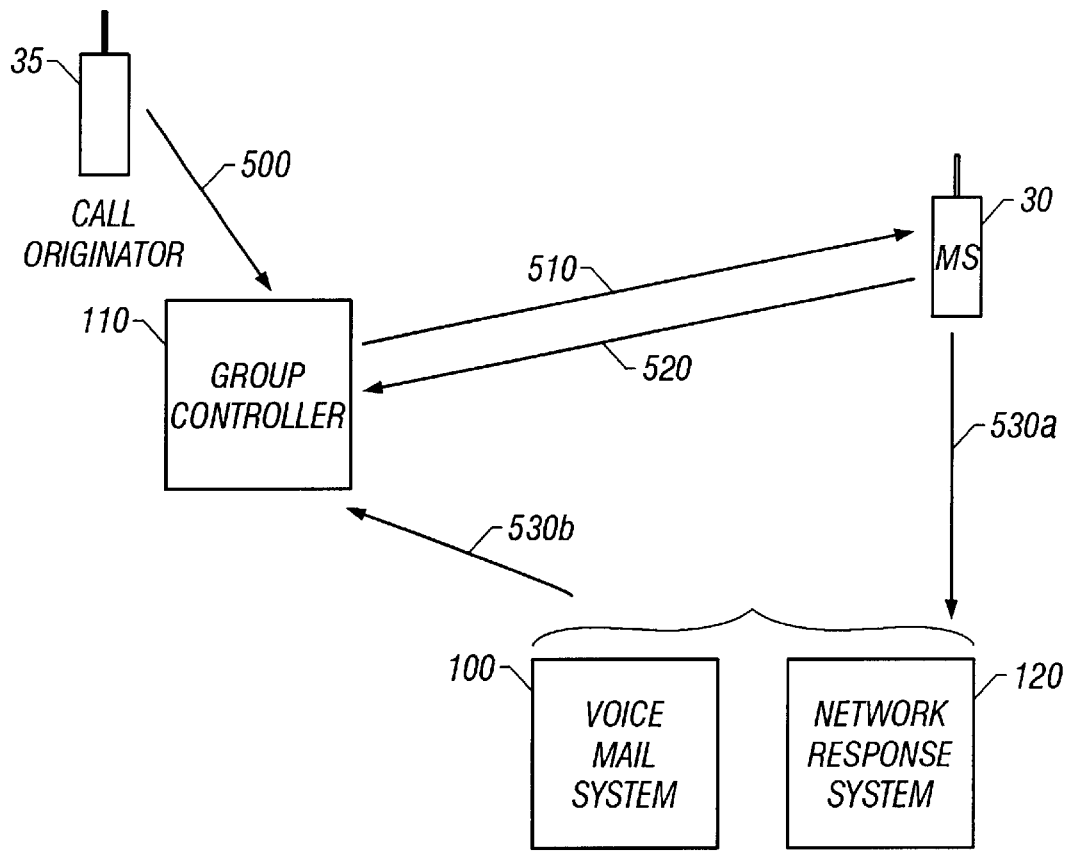
FIG. 4 is a block diagram illustrating the sequence of events involved in setting up a group call using a B-answer signal so as to prevent voice announcements according to the present invention.
Figure 5:
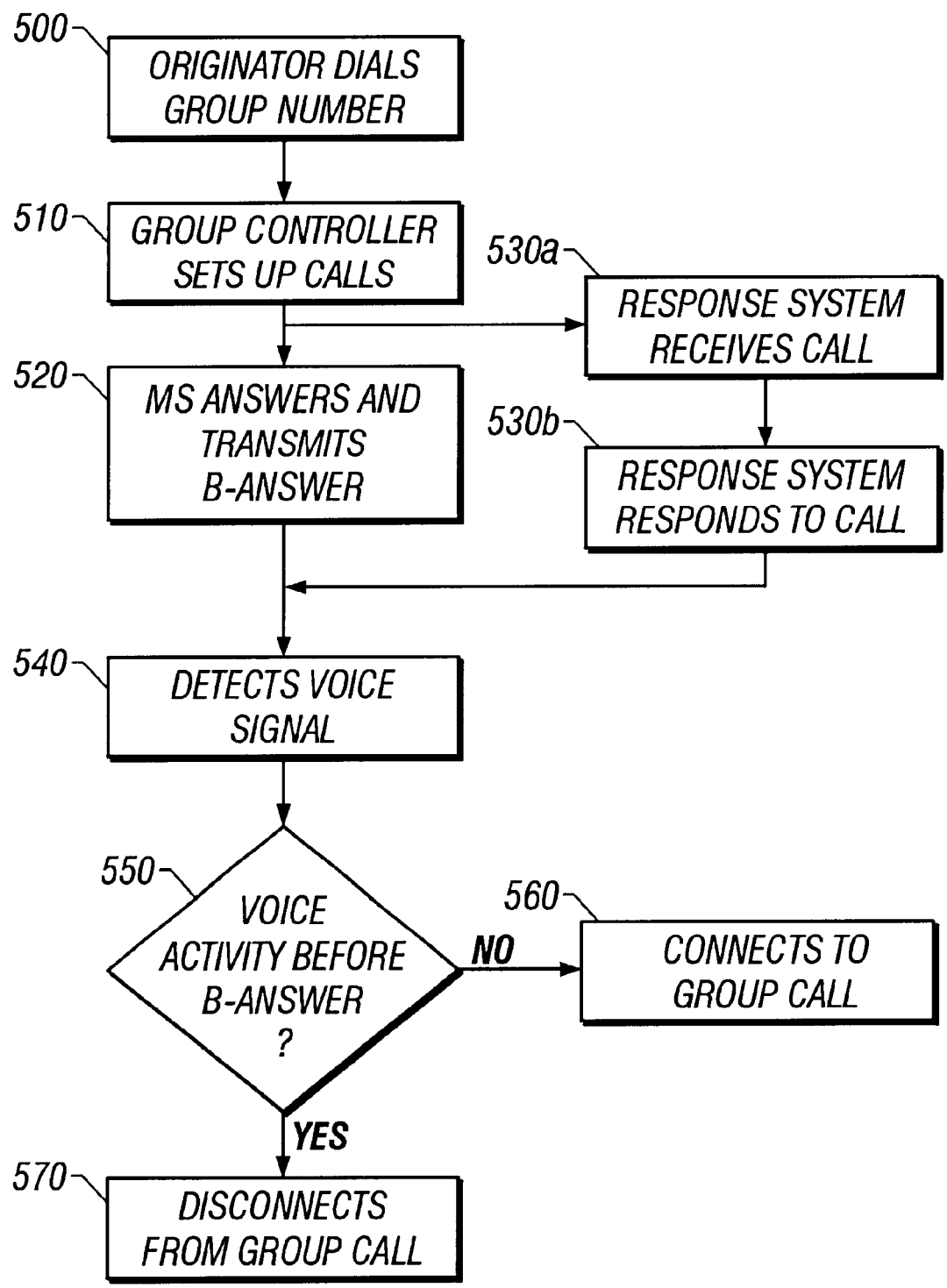
FIG. 5 is a logic diagram illustrating a technique of using a B-answer signal to prevent voice announcements that a group controller may incorporate to implement the present invention.

The present invention can best be understood with reference to FIGS. 4–5. FIG. 4 illustrates the various components involved in preventing voice mail announcements in a group call using a B-answer signal according to the present invention. The various components include a call originator 35 for initiating a request for a group call by supplying a group call number, a mobile station 30 exemplary of the participants in the group call, a voice mail system 100, a network response system 120, and a group controller 110. FIG. 4 also illustrates, in conjunction with FIG. 5, the sequence of events involved in setting up a group call using a B-answer signal to prevent voice announcements according to the present invention.

FIG. 5 is a logic diagram illustrating the steps involved in preventing voice mail announcements in a group call using a B-answer signal according to the present invention. At step 500, the originator 35 of the group call, which may be a fixed station coupled to the PSTN 20 or a mobile station coupled to one of the PLMNs 10, initiates a group call by dialing a group number which is identified by the network 1 (typically at an MSC) and passed on to the group controller 110. At step 510, the group controller 110 attempts to establish a connection through the network 1 with every subscriber in the list of subscribers associated with the group call (including the call originator 35) by making an individual call to each of the subscribers in the list of subscribers associated with the group call. In the case where one of the subscribers answers the individual call (e.g., the mobile station 30), as part of completing the connection according to the protocol of the signaling system, the mobile system 30 generates a B-answer signal (where "B" signifies the answer signal received from the called party) which is received by the calling party, in this case the group controller 110 (in step 520). This B-answer signal is received over a signaling channel before any voice activity is generated by the person answering the call. The B-answer signal is a preexisting signal that is typically generated in network signaling system. For example, the B-answer signal is generated in Signaling System 7, which is a signaling system that is known widely in the telecommunications art. Consequently, as will be more fully appreciated and understood after reading the remainder of this detailed description, it is not necessary to significantly modify any of the components of the network 1 in order to perform the operations of the present invention. In particular, the mobile station (MS) 30, the voice mail system 100, and the network response system 120 need not be modified at all for the present invention to work.

In the case where one of the subscribers does not answer its individual call, the individual call is forwarded either to the voice mail system 100 or to the network response system 120 (in step 530a). This requires the subscriber to have the supplementary Call Forward service. Typically, the individual call is not answered because the mobile station 30 has forwarded the individual call to the voice mail system 100. However, in an alternate embodiment, the individual call could be forwarded to the network response system 120. The network response system 120 handles calls that cannot be completed due to various problems in the network. After the individual call is forwarded to either the voice mail system 100 or the network response system 120, a connection is established between the group controller 110 and either the voice system 100 or the network response system 120, respectively. After being connected to the group controller 110, the voice mail system 100 or the network response system 120 will typically send a voice announcement to the group controller 110 (in step 530b).

The group controller 110 and associated processing unit 109 implement steps 540, 550, 560, and 570. At step 540, the voice detector 113 of the group controller 110 is configured to detect any voice activity from the called party. In step 550, the group controller 110 determines if any detected voice activity occurs before a B-answer signal is received. In the situation where the mobile station 30 answers the call and a B-answer signal is received, the group controller 110 connects the mobile station 30 to the group call (in step 560). Although, there may be voice activity on the line because of the subscriber answering the call, such voice activity will have been generated after the B-signal and thus will not be considered. In the situation where the voice mail system 100 or the network response system 120 answers the call, there will be voice activity (i.e., the voice announcement) but no B-answer signal. That is, the B-answer signal only appears if and when the response system gives the caller an opportunity to record a voice message. Therefore, the voice detector 112 will detect the voice activity, and the group controller 110 will subsequently exclude the call from the group call (in step 570).

Therefore, according to the present invention, if voice activity is detected on a call connection before a B-answer signal is received, the call will not be added to the group call. Thus, only those parties for which a B-answer signal is received first will be added to the group call. This solution assures that no voice mail announcements will be added to a group call. An additional advantage of this approach is that it does not require any special modification of the mobile equipment or voice mail system.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method for preventing a voice announcement in a group call, the group call involving a plurality of potential participants of the group call, each of the plurality of potential participants of the group call receiving an individual call from a group controller, a first potential participant of the plurality of potential participants of the group call forwarding its received individual call to a response system, the method comprising the steps of:

generating, in response to the forwarded individual call, an announcement signal including voice activity;

detecting the voice activity of the announcement signal; and excluding the first potential participant from the group call if the voice activity of the announcement signal is detected before a B-answer signal is received.

2. The method of claim 1, wherein:

the response system generates the announcement signal.

3. The method of claim 1, wherein:

the response system is a network response system.

4. The method of claim 1, wherein:

the response system is a voice mail system.

5. The method of claim 1, wherein:

the detecting step is implemented by a voice detector associated with the group controller, the voice detector being configured to detect the voice activity.

6. The method of claim 1, wherein:

the step of excluding the first potential participant from the group call includes disconnecting the first potential participant from the group call.

7. The method of claim 1, wherein:

the group call is formed over a telecommunication network which includes one or more Public Land Mobile Networks.

8. The method of claim 1, wherein:

the group call is formed over a telecommunications network which includes a Public Switched Telephone Network.

9. The method of claim 1, further comprising the step of:

connecting to the group call a second potential participant of the plurality of potential participants of the group call, the second potential participant not forwarding its individual call to the response system so that a B-answer signal is generated before any voice activity.

10. The method of claim 1, wherein:

the plurality of potential participants are subscribers of a Public Land Mobile Network.

11. An apparatus for preventing a voice announcement in a group call, the group call having a plurality of potential participants, the group call being established in a telecommunications network by establishing a call connection in the network for each of the plurality of potential participants of the group call, the apparatus comprising:

a voice detector, coupled to the network, configured to detect voice activity on any one of the individual call connections; and a group controller associated with the voice detector and configured to disconnect the any one of the call connections if the voice activity on the any one of the call connections is detected before a B-answer signal is received.

12. The apparatus of claim 11, further comprising:

a response system for generating voice activity in response to one of the call connections.

13. The apparatus of claim 12, wherein:

the response system is a network response system.

14. The apparatus of claim 12, wherein:

the response system is a voice mail system.

15. The apparatus of claim 11, further comprising:

a mobile station for generating the B-answer signal in response to one of the call connections.

16. A system for preventing a voice announcement in a group call, the group call having a plurality of potential participants, the group call being established in a telecommunications network by signaling the plurality of potential participants of the group call to establish an individual call connection for each of the plurality of potential participants of the group call, the system comprising:

a response system, coupled to the network, configured to generate a voice announcement including voice activity upon being signaled over the network; and a group controller, coupled to the network, comprising:
a voice activity detector for detecting the voice activity and;
a processing unit coupled to the voice detector for disconnecting the any one of the call connections if the voice activity associated with the any one of the call connections is detected before a B-answer signal is received.

17. The system of claim 16, wherein:

the potential participants are subscribers of one or more Public Land Mobile Networks.

18. The system of claim 16, further comprising:

a mobile station generating the B-answer signal in response to one of the call connections.

19. The system of claim 16, wherein:

the response system is a network response system.

20. The system of claim 16, wherein:

the response system is a voice mail system.

21. The system of claim 16, wherein:

the telecommunication network includes one or more Public Land Mobile Networks.

* * * * *